(12) United States Patent
Abe et al.

(10) Patent No.: US 11,898,532 B2
(45) Date of Patent: Feb. 13, 2024

(54) HYDROPOWER GENERATION SYSTEM AND POWER GENERATOR CONTROL METHOD

(71) Applicant: DAIKIN INDUSTRIES, LTD., Osaka (JP)

(72) Inventors: Takahiro Abe, Osaka (JP); Atsushi Suhara, Osaka (JP); Takao Sonoda, Osaka (JP); Takahiro Yokoyama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 17 days.

(21) Appl. No.: 17/702,709

(22) Filed: Mar. 23, 2022

(65) Prior Publication Data

US 2022/0213864 A1 Jul. 7, 2022

Related U.S. Application Data

(63) Continuation of application No. PCT/JP2020/036551, filed on Sep. 28, 2020.

(30) Foreign Application Priority Data

Sep. 26, 2019 (JP) .................................. 2019-175357

(51) Int. Cl.
*F03B 15/00* (2006.01)
*F03B 15/08* (2006.01)
*H02P 101/10* (2015.01)

(52) U.S. Cl.
CPC .......... *F03B 15/08* (2013.01); *H02P 2101/10* (2015.01)

(58) Field of Classification Search
CPC ........ H02P 9/008; H02P 9/04; H02P 2101/10; F03B 15/08; Y02E 10/20
See application file for complete search history.

(56) References Cited

U.S. PATENT DOCUMENTS

| 4,352,025 | A | * | 9/1982 | Troyen ............... | F03B 13/00 415/145 |
|---|---|---|---|---|---|
| 2019/0331086 | A1 | * | 10/2019 | Abe .................. | H02P 9/008 |
| 2020/0386202 | A1 | * | 12/2020 | Abe .................. | F03B 15/16 |

FOREIGN PATENT DOCUMENTS

| JP | 2014-214710 A | 11/2014 |
|---|---|---|
| JP | 2019-126233 A | 7/2019 |

(Continued)

OTHER PUBLICATIONS

International Preliminary Report of corresponding PCT Application No. PCT/JP2020/036551 dated Apr. 7, 2022.

(Continued)

*Primary Examiner* — Julio C. Gonzalez
(74) *Attorney, Agent, or Firm* — Global IP Counselors, LLP (57) ABSTRACT

A hydroelectric power generation system is included in a channel control system. The channel control system includes a command section that outputs a command value of a flow rate or pressure of a fluid, an opening degree control unit that calculates a target opening degree based on the command value, and a motor-operated valve installed in a channel through which the fluid flows. The valve opens and closes in accordance with the target opening degree. The hydroelectric power generation system includes a water turbine disposed in the channel, a generator driven by the water turbine, and a generator control unit that controls at least one of a torque and a number of rotations of the generator based on opening degree information that indicates a measured value of an actual opening degree of the valve or an opening degree estimated.

9 Claims, 10 Drawing Sheets

(56) References Cited

FOREIGN PATENT DOCUMENTS

| | | | |
|---|---|---|---|
| JP | 2019-161811 A | 9/2019 | |
| WO | WO-2018056088 A1 * | 3/2018 | .............. F03B 15/08 |
| WO | WO-2018135661 A1 * | 7/2018 | .............. F03B 15/04 |

OTHER PUBLICATIONS

International Search Report of corresponding PCT Application No. PCT/JP2020/036551 dated Nov. 24, 2020.
European Search Report of corresponding EP Application No. 20 86 8817.6 dated Jul. 24 2023.

* cited by examiner

HYDROPOWER GENERATION SYSTEM AND POWER GENERATOR CONTROL METHOD

CROSS-REFERENCE TO RELATED APPLICATIONS

This is a continuation of International Application No. PCT/JP2020/036551 filed on Sep. 28, 2020, which claims priority to Japanese Patent Application No. 2019-175357, filed on Sep. 26, 2019. The entire disclosures of these applications are incorporated by reference herein.

BACKGROUND

Technical Field

The present disclosure relates to a hydroelectric power generation system and a generator control method.

BACKGROUND ART

There has been a hydroelectric power generation system that generates power by a fluid, such as water, flowing through a channel. For example, a hydroelectric power generation system disclosed in Japanese Unexamined Patent Publication No. 2014-214710 includes a water turbine, a generator connected to the water turbine, and a generator control unit configured to control the torque applied to the generator. When, in this hydroelectric power generation system, the fluid causes the water turbine to rotate, the generator connected to the water turbine is driven. The flow rate or pressure of the fluid is controlled by the control on the torque applied to the generator.

SUMMARY

A first aspect of the present disclosure is directed to a hydroelectric power generation system included in a channel control system. The channel control system includes a command section configured to output a command value of a flow rate or pressure of a fluid, an opening degree control unit configured to calculate a target opening degree based on the command value output by the command section, and a motor-operated valve installed in a channel through which the fluid flows. The valve is configured to open and close in accordance with the target opening degree. The hydroelectric power generation system includes a water turbine disposed in the channel in series or parallel with the motor-operated valve, a generator configured to be driven by the water turbine, and a generator control unit configured to control at least one of a torque and a rotational speed rotational speed of the generator based on opening degree information. The opening degree information indicates a measured value of an actual opening degree of the motor-operated valve or an opening degree estimated based on the at least one of the torque and the rotational speed of the generator.

DETAILED DESCRIPTION OF EMBODIMENT(S)

Embodiments of the present disclosure will now be described in detail with reference to the drawings. Note that the following embodiments and variations are merely beneficial examples in nature, and are not intended to limit the scope, applications, or use of the invention.

First Embodiment

Figure 1:
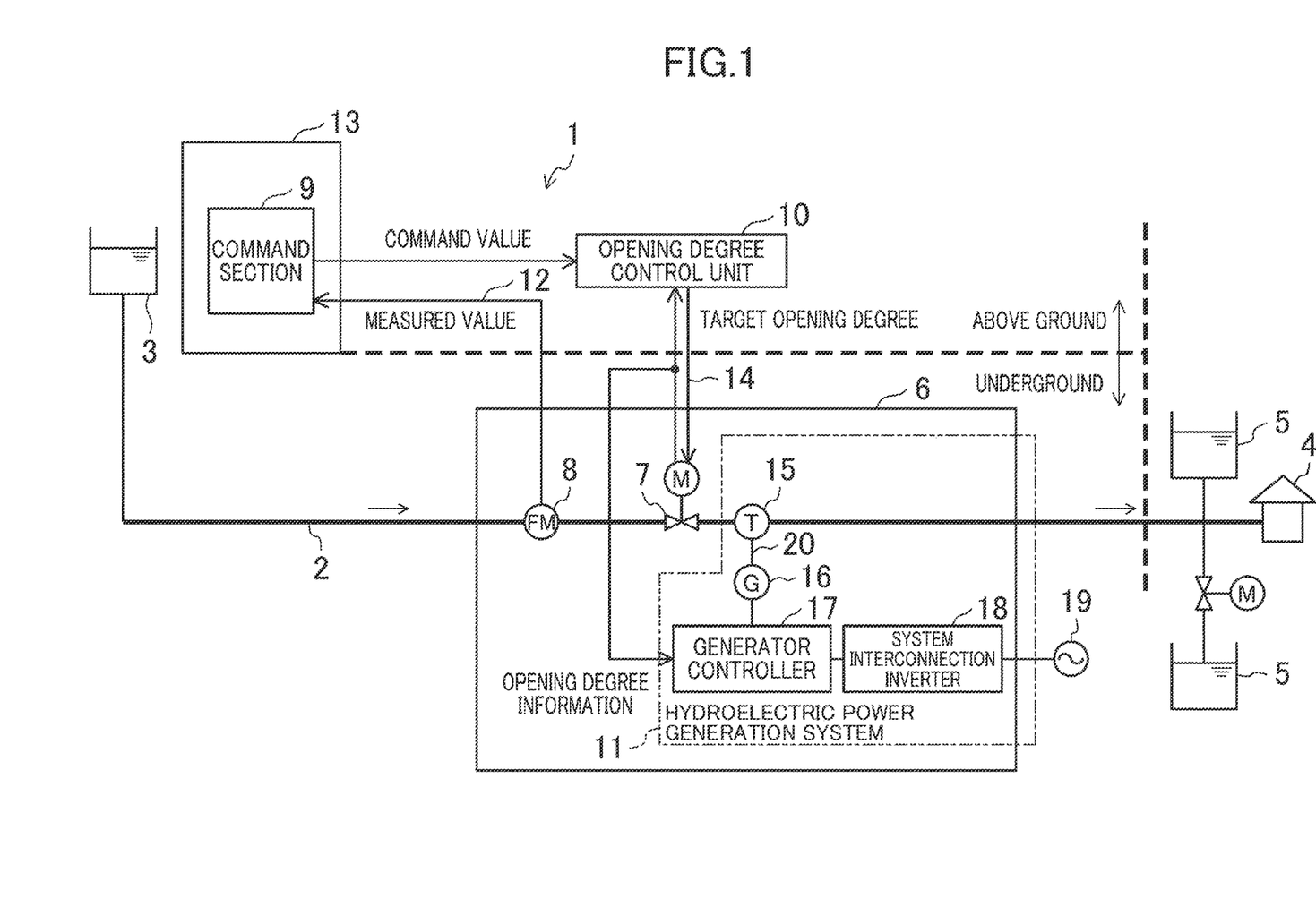
FIG. 1 is a diagram schematically illustrating an overall configuration of a channel control system including a hydroelectric power generation system according to a first embodiment.

FIG. 1 shows a channel control system (1). This channel control system (1) is used for a water supply system. The channel control system (1) has a channel (2), which forms a pipeline between a water distribution tank (3) and a water supply target (4), such as a house, or a distributing reservoir (5). The channel (2) is a waterway through which water flows with a head. Part of the channel (2) passes through an underground piping room (6).

Channel Control System

The channel control system (1) includes a motor-operated valve (7), a sensor (8), a command section (9), an opening degree control unit (10), and a hydroelectric power generation system (11) according to a first embodiment of the present disclosure. The motor-operated valve (7) and the sensor (8) are housed in the piping room (6). In this state, the motor-operated valve (7) and the sensor (8) are arranged in series with each other in a portion of the channel (2) housed in the piping room (6) sequentially from the downstream side of the channel (2).

The motor-operated valve (7) opens and closes in accordance with a target opening degree, which will be described below. The motor-operated valve (7) outputs an analog signal indicating a measured value of its actual opening degree as opening degree information. The analog signal indicates any value of from 0% to 100%, which has been measured by an opening degree sensor (not shown) installed on the motor-operated valve (7).

The sensor (8) measures the flow rate of a fluid flowing through the channel (2). The value measured by the sensor (8) is transmitted through a first electric wire (12) to the command section (9).

The command section (9) is housed in a main control room (13) above the ground. The command section (9) calculates a command value of the flow rate of the fluid based on the value measured by the sensor (8) so that the value measured by the sensor (8) be an intended value. The command section (9) outputs the calculated command value to the opening degree control unit (10).

The opening degree control unit (10) calculates the target opening degree based on the command value calculated by the command section (9). The target opening degree is transmitted through a second electric wire (14) to the motor-operated valve (7) in the underground piping room (6).

Hydroelectric Power Generation System

Figure 2:
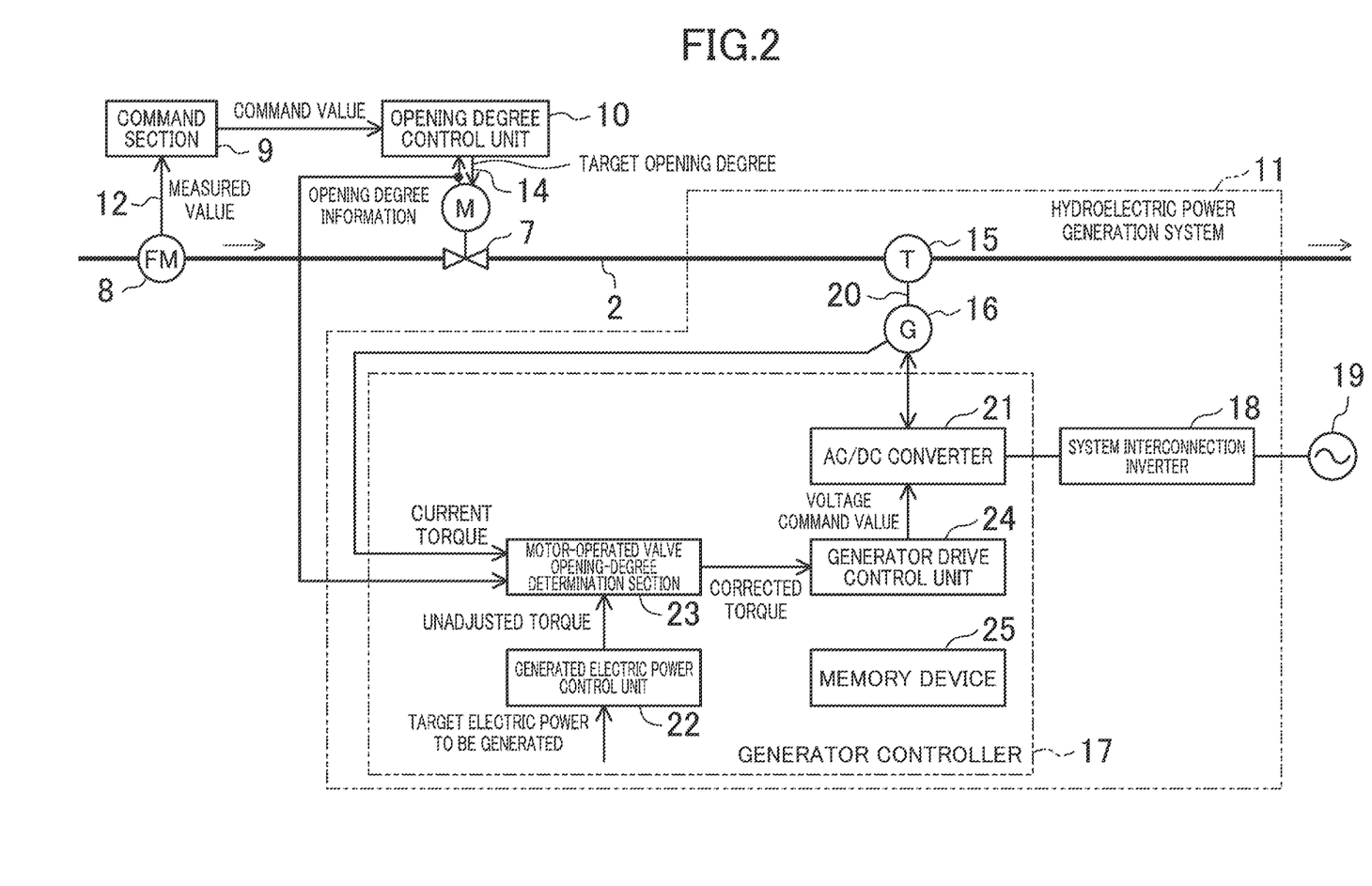
FIG. 2 is a block diagram illustrating a configuration of the hydroelectric power generation system according to the first embodiment.

As shown also in FIG. 2, the hydroelectric power generation system (11) includes a water turbine (15), a generator (16) driven by the water turbine (15), a generator controller (17) serving as a generator control unit, and a system interconnection inverter (18). The hydroelectric power generation system (11) generates electric power, which is supplied to an electric power system (19). The electric power system (19) is so-called power grid.

Water Turbine

The water turbine (15) is disposed in the portion of the channel (2) housed in the piping room (6) in series with the sensor (8) and the motor-operated valve (7), and is housed in the piping room (6). The water turbine (15) is disposed downstream of the motor-operated valve (7). The water turbine (15) is a reverse running pump turbine including a centrifugal pump.

Generator

The generator (16) is housed in the piping room (6), and is connected through a shaft (20) to the water turbine (15). Rotation of the water turbine (15) drives the generator (16). Thus, the generator (16) operates in a regenerative mode. The generator (16) operating in the regenerative mode generates electric power.

The generator controller (17) is housed in the piping room (6), and is configured to be capable of supplying electric power from the electric power system (19) to the generator (16). Receiving the electric power of the electric power system (19) through the generator controller (17), the generator (16) operates in a power running mode. The generator (16) operating in the power running mode functions as a motor for rotationally driving the water turbine (15).

Generator Controller

The generator controller (17) includes an alternating current/direct current (AC/DC) converter (21), a generated electric power control unit (22), a motor-operated valve opening-degree determination section (23), a generator drive control unit (24), and a memory device (25). The generator controller (17) controls the torque of the generator (16) with reference to target electric power to be generated and the opening degree information output by the motor-operated valve (7). The target electric power to be generated is input from a controller (not shown), or set at a fixed value in advance.

The AC/DC converter (21) includes a plurality of switching elements, and converts the electric power (AC power) generated by the generator (16) into DC power by switching. The output of the AC/DC converter (21) is smoothed by a smoothing capacitor, and is output to the system interconnection inverter (18).

The generated electric power control unit (22) calculates the torque that makes the electric power generated by the generator (16) coincide with the target electric power to be generated, as unadjusted torque, based on the target electric power to be generated. The memory device (25) stores the relationship among the torque, rotational speed, and generated electric power of the generator (16) on a maximum efficiency curve of the water turbine (15) in the form of a map. The generated electric power control unit (22) calculates unadjusted torque, based on the relationship among the torque, rotational speed, and generated electric power of the generator (16) stored in the memory device (25) and the target electric power to be generated.

If the opening degree indicated by the opening degree information output by the motor-operated valve (7) is less than a first threshold value, the motor-operated valve opening-degree determination section (23) corrects the unadjusted torque calculated by the generated electric power control unit (22) to reduce the flow rate of the water turbine (15) and to increase the effective head of the water turbine (15). The result of this correction is output as the corrected torque. Specifically, the unadjusted torque is corrected so that the corrected torque is less than the current torque. In contrast, if the opening degree indicated by the opening degree information output by the motor-operated valve (7) is greater than a second threshold value, the motor-operated valve opening-degree determination section (23) corrects the unadjusted torque calculated by the generated electric power control unit (22) to increase the flow rate of the water turbine (15) and to reduce the effective head of the water turbine (15). The result of this correction is output as the corrected torque. Specifically, the unadjusted torque is corrected so that the corrected torque is greater than the current torque. If the opening degree indicated by the opening degree information output by the motor-operated valve (7) is greater than or equal to the first threshold value and less than or equal to the second threshold value, the motor-operated valve opening-degree determination section (23) outputs the unadjusted torque calculated by the generated electric power control unit (22) as the corrected torque without any change. The first threshold value is set at a value above 0%, and the second threshold value is set at a value below 100%.

The generator drive control unit (24) calculates a voltage command value based on the corrected torque output by the motor-operated valve opening-degree determination section (23), and controls the switching elements of the AC/DC converter (21) based on the voltage command value.

The motor-operated valve opening-degree determination section (23) calculates the corrected torque as described above at predetermined intervals. The interval is set such that the rate of the flow rate change resulting from a change in the torque of the generator (16) is lower than a predetermined set rate. As the predetermined set rate, a rate lower than or equal to the lowest rate of flow rate change resulting from the opening/closing of the motor-operated valve (7) is stored in the memory device (25) or any other suitable component in advance.

Characteristics of Hydroelectric Power Generation System and Channel

Figure 3:
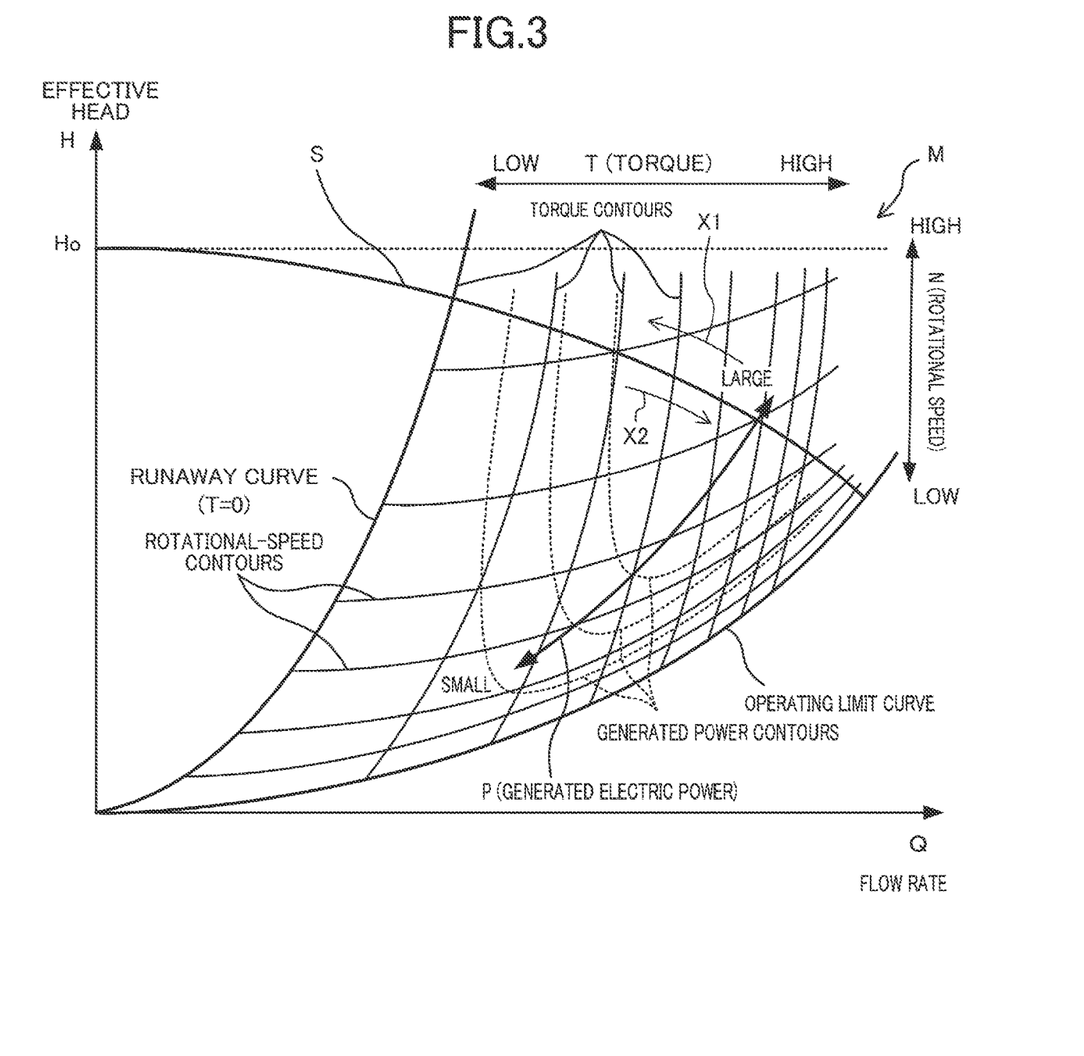
FIG. 3 is a graph showing a characteristic map of the hydroelectric power generation system.

FIG. 3 is a graph (referred to as a "characteristic map (M)") showing the characteristics of the water turbine (15). In FIG. 3, the vertical axis represents the effective head (H) of the water turbine (15), and the horizontal axis represents the flow rate (Q) of water flowing through the water turbine (15). The effective head (H) is obtained through subtraction of a head corresponding to a pipe resistance observed while the water in the water distribution tank (3) flows to the outlet end of the channel (2) via the pipeline, from the head between the liquid level of the water distribution tank (3) and the outlet end of the channel (2).

The relationship between the effective head (H) and flow rate (Q) of the water turbine (15) can be represented by a system loss curve (flow resistance characteristic curve) (S) shown in FIG. 3. A characteristic of the system loss curve (S) is that the effective head (H) is reduced with the increase in the flow rate (Q). A point corresponding to the flow rate (Q) and the effective head (H) of the water turbine (15), i.e., the water turbine operating point, always moves on the system loss curve (S).

In the characteristic map (M) of FIG. 3, the torque (T) of the generator (16), the rotational speed (rotational speed) (N) of the generator (16), and the generated electric power (P) of the generator (16) are represented as the characteristics correlated with the flow rate (Q) and effective head (H) of the water turbine (15).

In the characteristic map (M), a region (referred to as a water turbine region or an operable region) in which the water turbine (15) can be rotated by the water flow is formed between a curve (referred to as a runaway curve (T=0)) in which the torque (T) of the generator (16) is 0 and a curve (referred to as an operating limit curve) in which the rotational speed (N) of the generator (16) is 0 or a predetermined minimum rotational speed. In FIG. 3, a region on the left of the runaway curve is a water turbine brake region (a power running region).

In the water turbine region, a plurality of torque contours are along the runaway curve, and the torque value (T) also increases in accordance with the increase in the flow rate (Q) on the characteristic map (M). Further, a plurality of rotational-speed contours are along the operating limit curve, and the rotational speed (N) increases with the increase in the effective head (H). On the system loss curve (S), the torque value (T) decreases with the decrease in the flow rate (Q). Further, on the system loss curve (S), the rotational speed (N) decreases with the increase in the flow rate (Q). Each of generated power contours indicated by broken lines is a curve convex downward, and the generated electric power (P) also increases with the increase in the effective head (H) and the flow rate (Q).

The relationship among the parameters in the characteristic map (M) described above is stored in the memory device (25) in the form of a table (numerical table) or a mathematical formula (function) in the program. Therefore, the generator controller (40) can perform various calculations and control using the relationship among the parameters represented in the characteristic map (M).

Operation

An operation of the channel control system (1) will be described.

Basic Operation

Water in the water distribution tank (3) flows through the channel (2). The water in the channel (2) passes through the motor-operated valve (7), and then flows through the water turbine (15). When the flow of water rotates the water turbine (15), the generator (16) generates power. The generator (16) in this state operates in the regenerative mode.

AC power generated by the generator (16) is converted into DC power by the AC/DC converter (21). The DC power obtained by the power conversion of the AC/DC converter (21) is converted into AC power by the system interconnection inverter (18). The resultant AC power is supplied to the electric power system (19).

Generator Control

How the hydroelectric power generation system (11) controls the generator will be described.

First, the generated electric power control unit (22) calculates the torque that makes the electric power generated by the generator (16) coincide with the target electric power to be generated, as an unadjusted torque, based on the relationship among the torque, rotational speed, and generated electric power of the generator (16) stored in the memory device (25) and on the target electric power to be generated. Next, the motor-operated valve opening-degree determination section (23) determines which of the following values the opening degree indicated by the opening degree information output by the motor-operated valve (7) is: a value less than the first threshold value, a value greater than the second threshold value, or a value greater than or equal to the first threshold value and less than or equal to the second threshold value. If the opening degree indicated by the opening degree information output by the motor-operated valve (7) is less than the first threshold value, the motor-operated valve opening-degree determination section (23) corrects the unadjusted torque calculated by the generated electric power control unit (22) to reduce the flow rate of the water turbine (15) and to increase the effective head of the water turbine (15). The result of this correction is output as the corrected torque. Specifically, the torque is corrected so that the water turbine operating point is moved on the system loss curve (S) in the direction indicated by the arrow X1 shown in FIG. 3. As a result, the corrected torque is smaller than the current torque. Thereafter, the generator drive control unit (24) calculates the voltage command value based on the corrected torque output by the motor-operated valve opening-degree determination section (23), and controls the switching elements of the AC/DC converter (21) based on the voltage command value. This reduces the flow rate of the water turbine (15) and the value measured by the sensor (8). In addition, the effective head of the water turbine (15) increases. Accordingly, the command section (9) outputs a command value to increase the opening degree of the motor-operated valve (7). As a result, the opening degree indicated by the opening degree information also increases. As can be seen, the torque of the generator (16) is controlled so that the opening degree indicated by the opening degree information is greater than or equal to the first threshold value that is above 0%. This can avoid the situation in which there is no room to reduce the flow rate of the fluid flowing through the channel (2) by the control of the motor-operated valve (7). The generator (16) is operable in the power running mode. Thus, the generator controller (17) can control the flow rate of the water turbine (15) to make the flow rate decrease to 0.

In contrast, if the opening degree indicated by the opening degree information output by the motor-operated valve (7) is greater than a second threshold value, the motor-operated valve opening-degree determination section (23) corrects the unadjusted torque calculated by the generated electric power control unit (22) to increase the flow rate of the water turbine (15) and to reduce the effective head of the water turbine (15). The result of this correction is output as the corrected torque. Specifically, the torque is corrected so that the water turbine operating point is moved on the system loss curve (S) in the direction indicated by the arrow X2 shown in FIG. 3. As a result, the corrected torque is greater than the current torque. Thereafter, the generator drive control unit (24) calculates the voltage command value based on the corrected torque output by the motor-operated valve opening-degree determination section (23), and controls the switching elements of the AC/DC converter (21) based on the voltage command value. This increases the flow rate of the water turbine (15) and the value measured by the sensor (8). In addition, the effective head of the water turbine (15) decreases. Accordingly, the command section (9) outputs the command value to decrease the opening degree of the motor-operated valve (7). As a result, the opening degree indicated by the opening degree information also decreases. As can be seen, the torque of the generator (16) is controlled so that the opening degree indicated by the opening degree information is less than or equal to the second threshold value that is below 100%. This can avoid the situation in which there is no room to increase the flow rate of the fluid flowing through the channel (2) by the control of the motor-operated valve (7).

If the opening degree indicated by the opening degree information output by the motor-operated valve (7) is greater than or equal to the first threshold value and less than or equal to the second threshold value, the motor-operated valve opening-degree determination section (23) outputs the unadjusted torque calculated by the generated electric power control unit (22) as the corrected torque without any change. Thereafter, the generator drive control unit (24) calculates the voltage command value based on the corrected torque output by the motor-operated valve opening-degree determination section (23), and controls the switching elements of the AC/DC converter (21) based on the voltage command value.

The rate of the flow rate change resulting from a change in the torque of the generator (16) is lower than the rate of flow rate change resulting from the opening/closing of the motor-operated valve (7). This can substantially prevent unstable flow rate control by the command section (9).

Advantages of First Embodiment

The generator controller (17) controls the torque of the generator (16) based on the measured value of the actual opening degree of the motor-operated valve (7), i.e., the opening degree of the motor-operated valve (7) determined based on the state of the motor-operated valve (7). This allows the control of the flow rate of the channel (2) reflecting the command value, without transmitting the command value directly to the generator controller (17). This eliminates the need for an electric wire that connects the command section (9) and the generator controller (17) together. Thus, work for burying a protective pipe that protects the electric wire connecting the command section (9) and the generator controller (17) together and work for making a hole in the piping room (6) to introduce the protective pipe into the piping room (6) are not necessary, which makes it possible to reduce the cost of the electric wiring work.

Since the generator controller (17) controls the torque of the generator (16) based on the measured value of the actual opening degree of the motor-operated valve (7), the generator (16) can be controlled based on the actual opening degree of the motor-operated valve (7) even when the actual opening degree of the motor-operated valve (7) differs from the target opening degree.

In addition, since it is not necessary for the generator controller (17) to perform calculation processing for the opening degree information based on the state of the generator (16), the function of the generator controller (17) can be achieved by using a less expensive arithmetic unit than in a case in which the generator controller (17) performs calculation for the opening degree information based on the state of the generator (16).

First Variation of First Embodiment

In a first variation of the first embodiment of the present disclosure, a generated electric power control unit (22) changes the torque by a fixed value at regular intervals, and determines the torque that maximizes the generated electric power by hill climbing. The output of the generator (16), the output of the AC/DC converter (21), or the output of the system interconnection inverter (18) can be used as the generated electric power to be fed back. The generator controller (17) and the AC/DC converter (21) may be replaced with a system interconnection matrix converter. In such a case, a reference can be made to the output of the system interconnection matrix converter as the generated electric power. The generated electric power control unit (22) outputs the torque in the process of the hill climbing as the unadjusted torque.

Second Variation of First Embodiment

Figure 4:
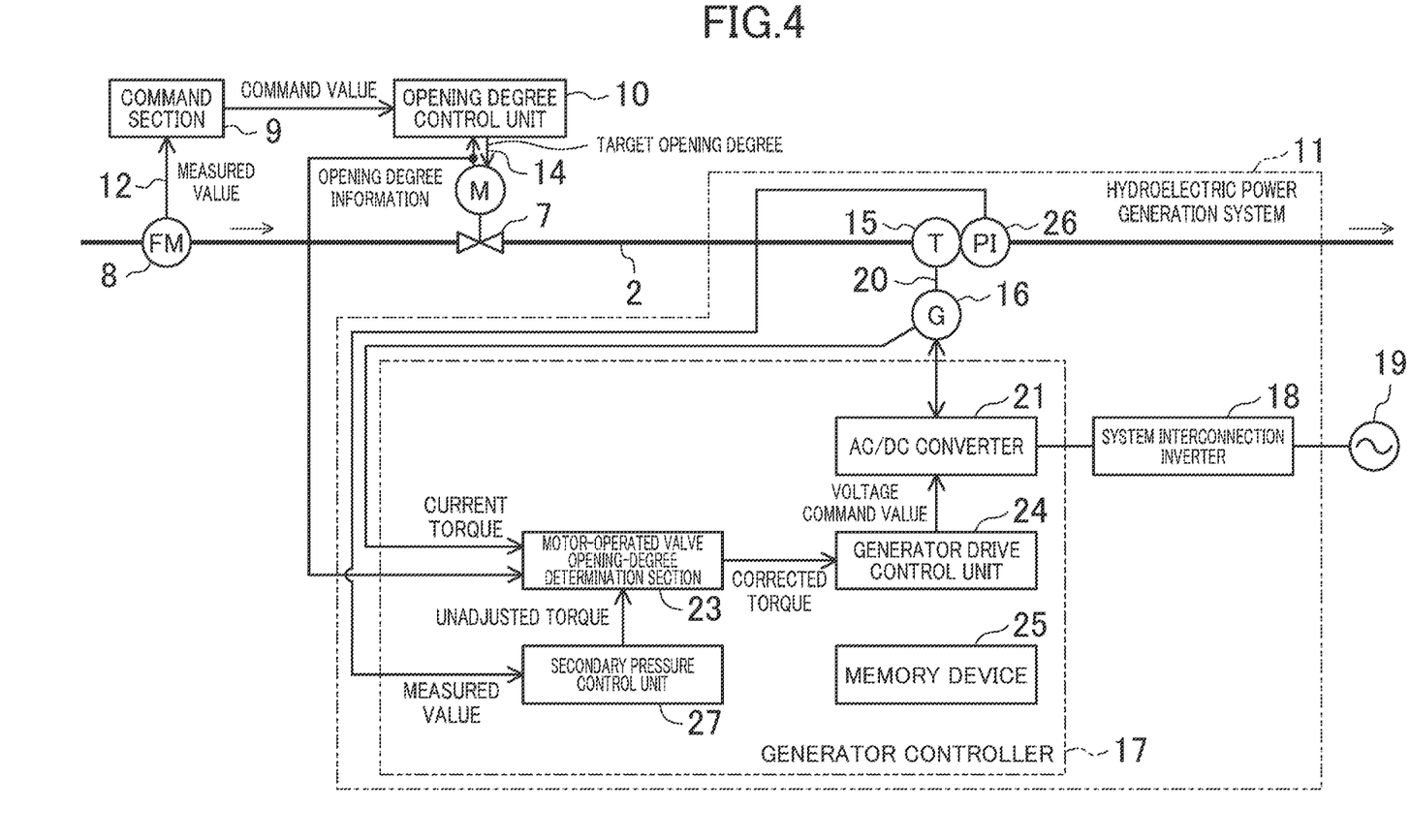
FIG. 4 corresponds to FIG. 2 and illustrates a second variation of the first embodiment.

FIG. 4 shows a channel control system (1) including a hydroelectric power generation system (11) according to a second variation of the first embodiment of the present disclosure. In the second variation, a pressure sensor (26) is installed downstream of a water turbine (15). A generator controller (17) includes a secondary pressure control unit (27) instead of the generated electric power control unit (22).

The secondary pressure control unit (27) calculates an unadjusted torque based on a value measured by the pressure sensor (26) so that the value measured by the pressure sensor (26) exceeds a predetermined set lower limit. The set lower limit is set to be the pressure at the installation site of the pressure sensor (26) observed when water in a distributing reservoir (5) downstream of the water turbine (15) is at the maximum water level.

First and second threshold values for use in the determination by the motor-operated valve opening-degree determination section (23) are set within the range that enables the flow rate control by the motor-operated valve (7). The first threshold value and the second threshold value are set to be, for example, 10% and 90%, respectively.

Figure 5:
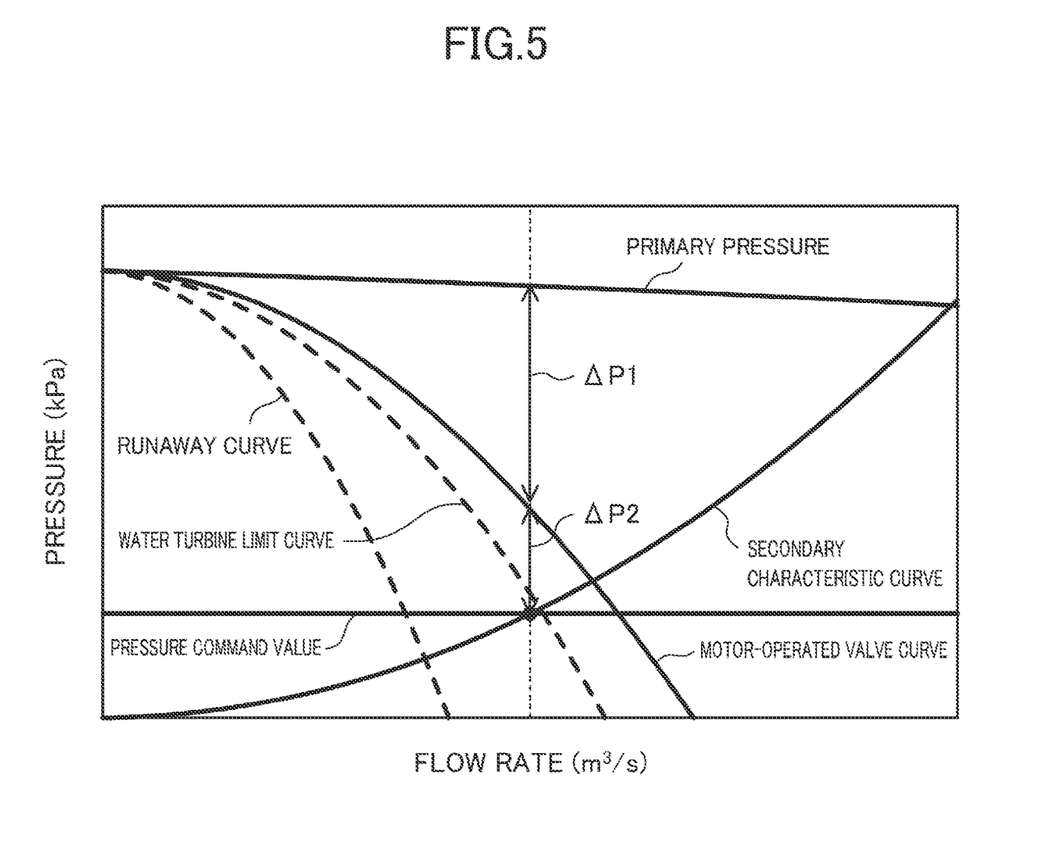
FIG. 5 is a graph showing the relationship between the flow rate and pressure in the hydroelectric power generation system.

In FIG. 5, ΔP1 represents the amount of pressure drop caused by the motor-operated valve (7), and ΔP2 represents the amount of pressure drop caused by the water turbine (15).

According to this second variation, the pressure on the downstream side of the water turbine (15) (secondary pressure) is controlled to exceed the predetermined set lower limit. It is therefore possible to avoid the backflow of water from the downstream side of the pressure sensor (26). This can reduce the number of check valves installed to prevent backflow.

Second Embodiment

Figure 6:
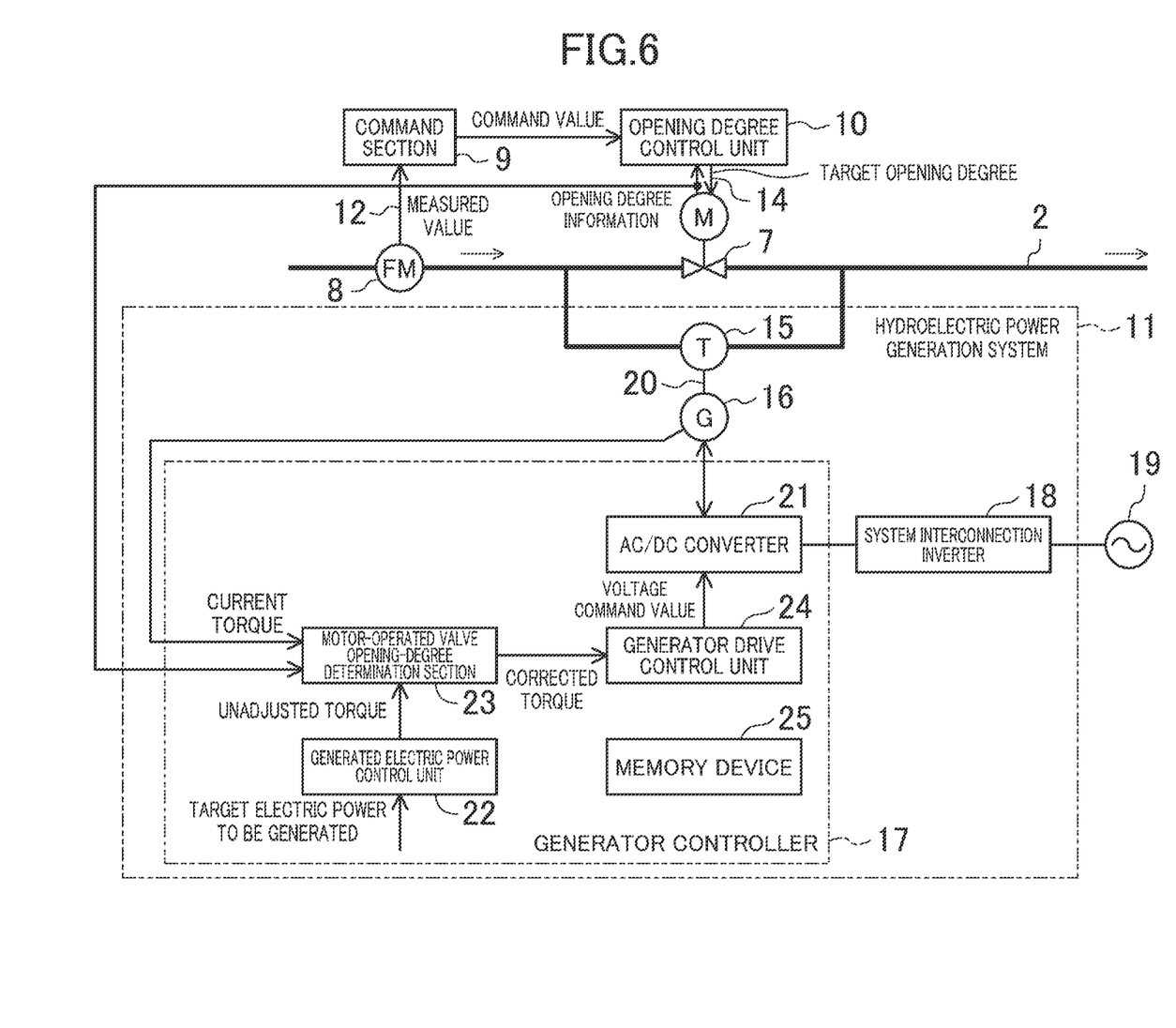
FIG. 6 corresponds to FIG. 2 and illustrates a second embodiment.

FIG. 6 shows a channel control system (1) including a hydroelectric power generation system (11) according to a second embodiment of the present disclosure. In this second embodiment, a water turbine (15) is connected to a channel (2) in parallel with a motor-operated valve (7).

The other configurations of this embodiment are the same as, or similar to, those of the first embodiment. Thus, the same reference characters are used to indicate the same components, which will not be described in detail.

Third Embodiment

Figure 7:
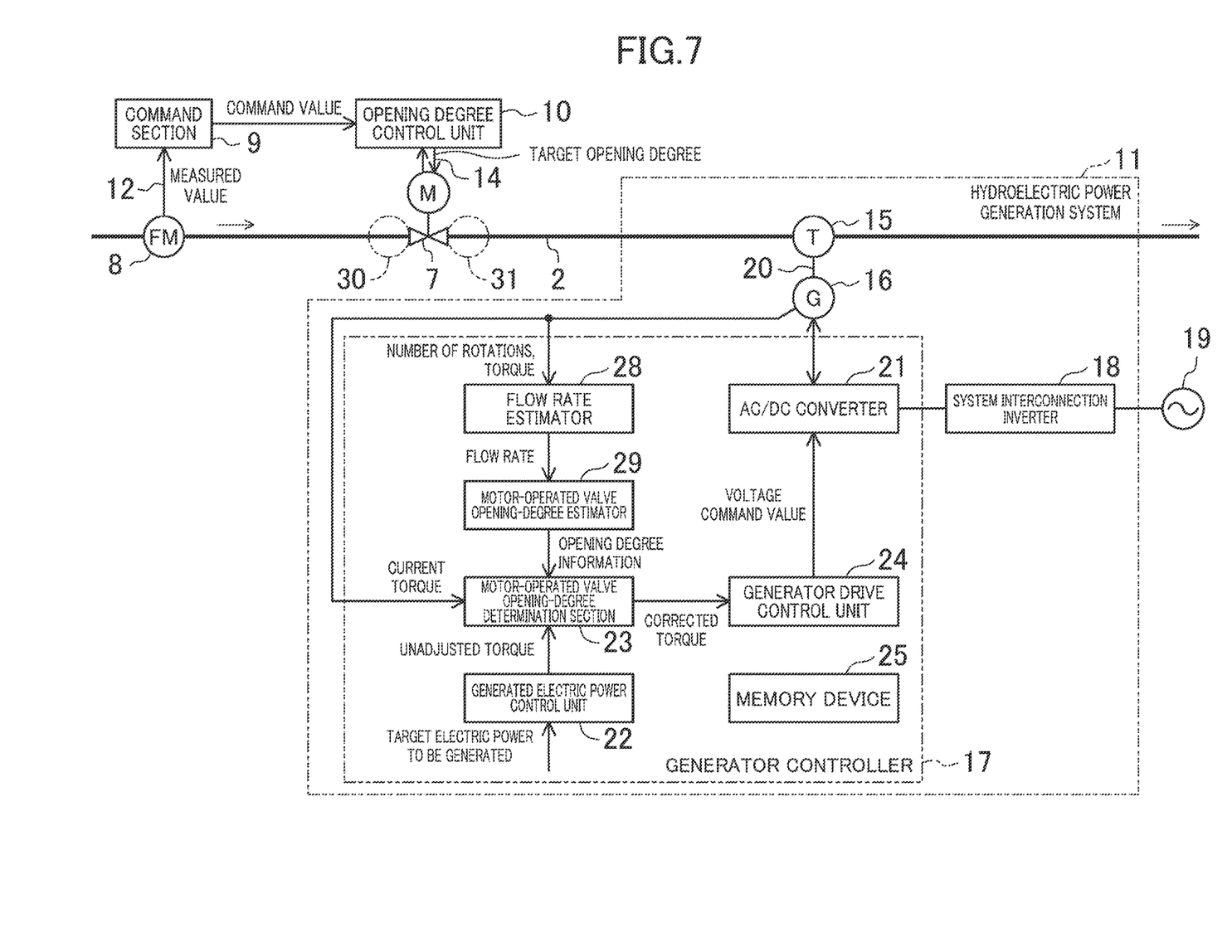
FIG. 7 corresponds to FIG. 2 and illustrates a third embodiment.

FIG. 7 shows a channel control system (1) including a hydroelectric power generation system (11) according to a third embodiment of the present disclosure. In this third embodiment, a generator controller (17) includes a flow rate estimator (28) and a motor-operated valve opening-degree estimator (29) in addition to an AC/DC converter (21), a generated electric power control unit (22), a motor-operated valve opening-degree determination section (23), and a generator drive control unit (24).

Figure 8:
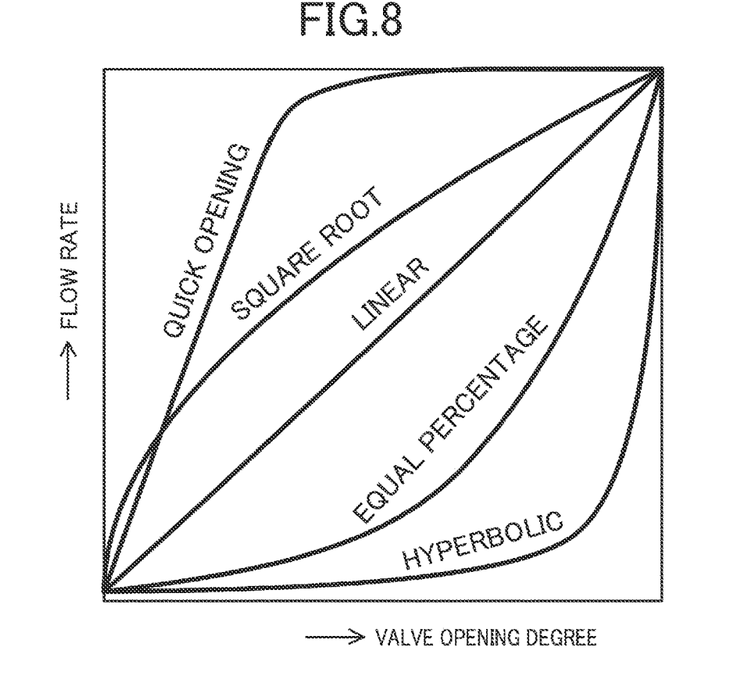
FIG. 8 is a graph showing the relationship between the flow rate and opening degree of each of five types of motor-operated valves.

FIG. 8 is a graph showing an example of the relationship between the flow rate and opening degree of each of five types of motor-operated valves (7). The relationship between the flow rate and opening degree of the motor-operated valve (7) represented by such a graph is stored in a memory device (25).

The flow rate estimator (28) estimates the flow rate of the motor-operated valve (7) to be the current flow rate of a water turbine (15), based on the current torque and rotational speed of a generator (16). This estimation is based on the relationship among parameters of a characteristic map (M). The motor-operated valve (7) and the water turbine (15) are connected together in series without a branch interposed therebetween. Thus, the flow rate of the water turbine (15) is substantially equal to the flow rate of the motor-operated valve (7). If one of the torque or the rotational speed is fixed, information indicating the relationship between the other one of the torque or the rotational speed and the flow rate of the water turbine (15) may be stored in advance, and the flow rate of the motor-operated valve (7) is estimated to be the flow rate of the water turbine (15), based on the information and one of the torque or the rotational speed.

The motor-operated valve opening-degree estimator (29) estimates (determines) the opening degree of the motor-operated valve (7) based on the flow rate of the motor-operated valve (7) estimated by the flow rate estimator (28) and the relationship between the flow rate and opening degree of the motor-operated valve (7) stored in the memory device (25). Then, information indicating the estimated opening degree is output as opening degree information.

The motor-operated valve opening-degree determination section (23) outputs a corrected torque based on the opening degree information output by the motor-operated valve opening-degree estimator (29).

The other configurations of this embodiment are the same as, or similar to, those of the first embodiment. Thus, the same reference characters are used to indicate the same components, which will not be described in detail.

Advantages of Third Embodiment

The opening degree information can be acquired not based on the state of the motor-operated valve (7) but based on the state of the generator (16). This eliminates the need to install an electric wire for transmitting information indicating the state of the motor-operated valve (7) from the motor-operated valve (7) to the generator (16). This can reduce the cost of the electric wire.

Variation of Third Embodiment

Figure 9:
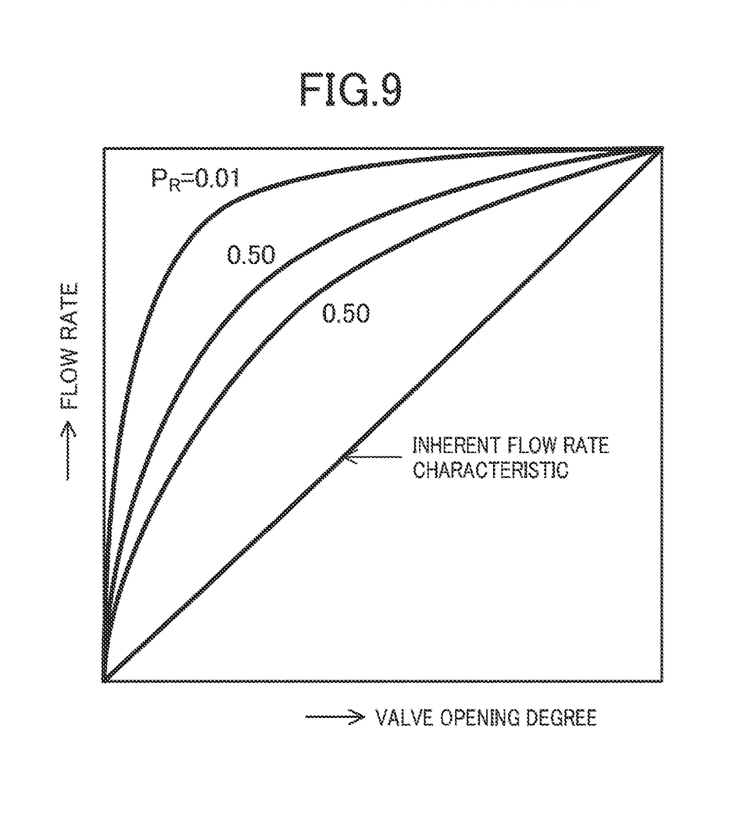
FIG. 9 is a graph showing the relationship between the flow rate and opening degree of a motor-operated valve with a linear characteristic.
Figure 10:
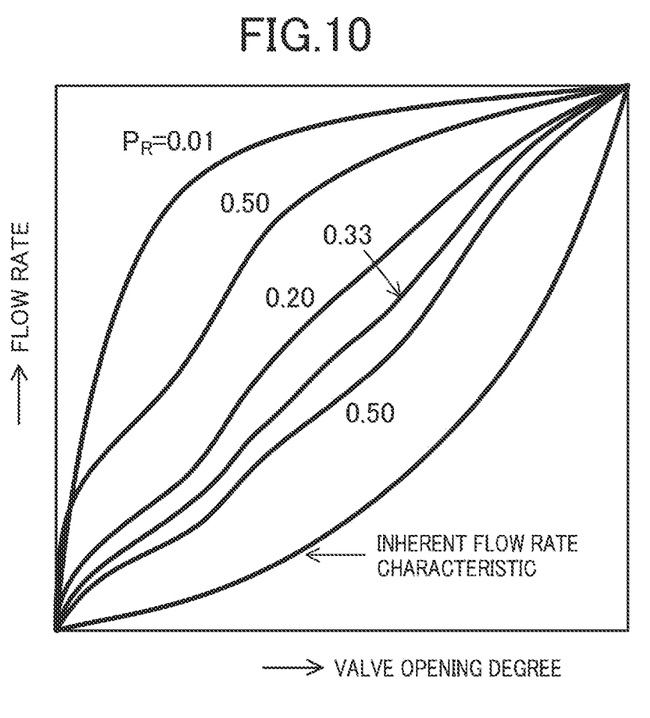
FIG. 10 is a graph showing the relationship between the flow rate and opening degree of a motor-operated valve with an equal percentage characteristic.

In a variation of the third embodiment, as indicated by the phantom curves in FIG. 7, an upstream pressure sensor (30) configured to measure the fluid pressure is installed on the upstream side of a motor-operated valve (7). A downstream pressure sensor (31) configured to measure the fluid pressure is also installed on the downstream side of the motor-operated valve (7). A memory device (25) stores the relationship between the flow rate and opening degree of the motor-operated valve (7) in relation to a plurality of pressure drop ratios $P_R$ as shown in the graphs of FIGS. 9 and 10, for example.

A motor-operated valve opening-degree estimator (29) calculates the pressure drop of the motor-operated valve (7) based on the difference between a value measured by the upstream pressure sensor (30) and a value measured by the downstream pressure sensor (31). The pressure drop ratio $P_R$ is calculated as indicated below, based on the pressure drop of the motor-operated valve (7) and the total pressure drop of the system including the motor-operated valve (7).

$P_R$=(Pressure Drop of Motor-Operated Valve (7))/
(Total Pressure Drop of System Including
Motor-Operated Valve (7))

The total pressure drop of the system including the motor-operated valve (7) is given by the following formula.

Total Pressure Drop=Pressure Drop of Motor-Operated Valve (7)+Pressure Drop of Water Turbine (15)+Pressure Drop of Pipe The pressure drop of a pipe can be calculated from a Darcy-Weisbach equation or a Hazen-Williams equation using the friction factor, the pipe length, the pipe bore diameter, the fluid density, and the flow rate.

The pressure drop (effective head) of the water turbine (15) can be estimated based on the torque and rotational speed of the generator (16). Pressure sensors may be provided on the upstream and downstream sides of the water turbine (15), and the difference between the values measured by both of the pressure sensors may be calculated as the pressure drop.

The motor-operated valve opening-degree estimator (29) estimates the opening degree of the motor-operated valve (7) based on the flow rate of the motor-operated valve (7) estimated by the flow rate estimator (28) and the relationship between the flow rate and opening degree of the motor-operated valve (7) determined by the pressure drop ratio $P_R$. Then, information indicating the estimated opening degree is output as opening degree information.

The other configurations of this variation are the same as, or similar to, those of the third embodiment, and thus will not be described in detail.

Fourth Embodiment

Figure 11:
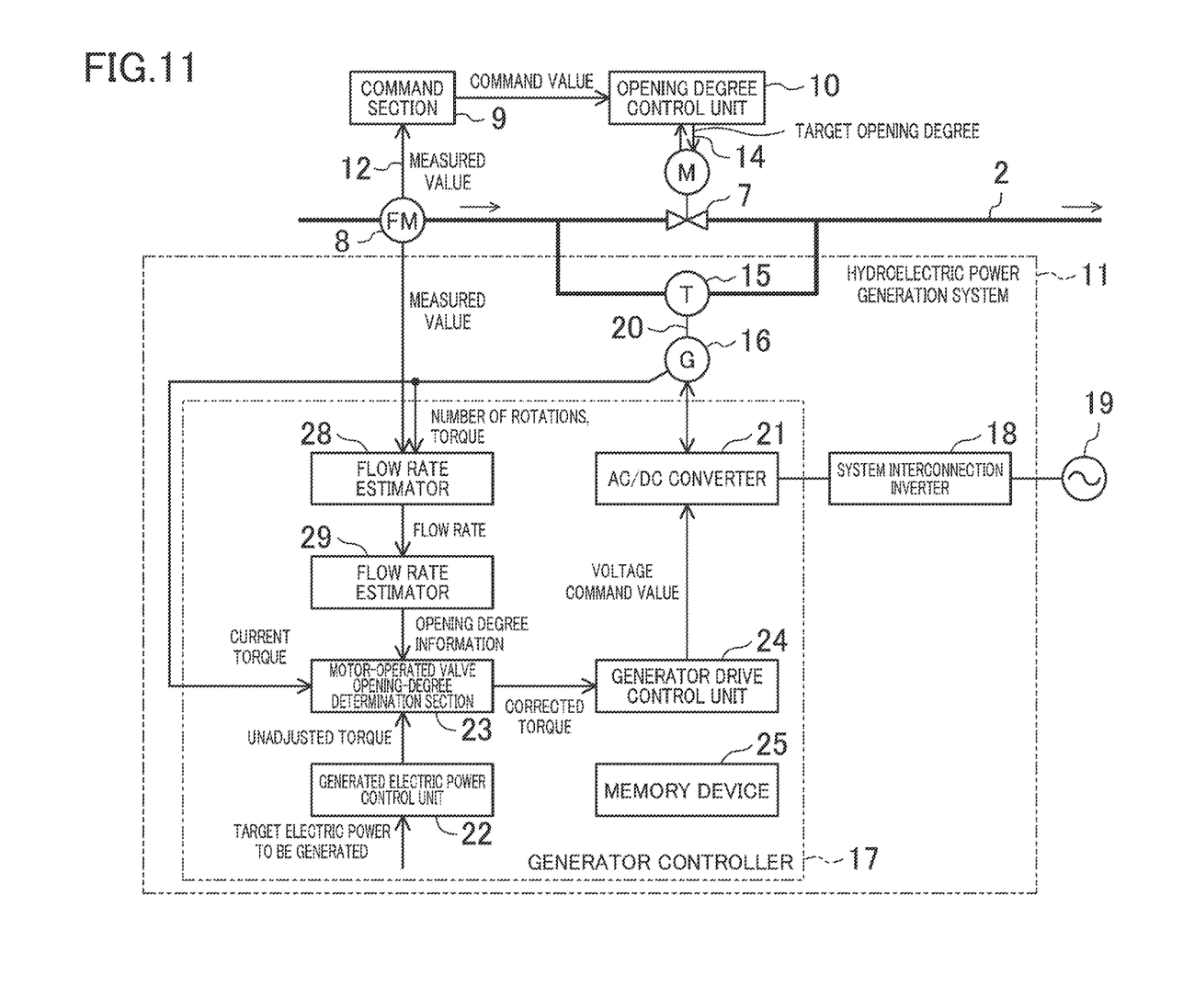
FIG. 11 corresponds to FIG. 2 and illustrates a fourth embodiment.

FIG. 11 shows a channel control system (1) including a hydroelectric power generation system (11) according to a fourth embodiment of the present disclosure. In this fourth embodiment, a water turbine (15) is connected to a channel (2) in parallel with a motor-operated valve (7). A sensor (8) is disposed in series with the motor-operated valve (7) and the water turbine (15).

A flow rate estimator (28) estimates the flow rate of the motor-operated valve (7) based on the state of a generator (16) and a value measured by the sensor (8). Specifically, the current flow rate of the water turbine (15) is first estimated based on the current torque and rotational speed of the generator (16). Then, the current flow rate of the water turbine (15) is subtracted from the flow rate indicated by the value measured by the sensor (8), and the result of this subtraction is estimated to be the flow rate of the motor-operated valve (7).

The other configurations of this embodiment are the same as, or similar to, those of the third embodiment. Thus, the same reference characters are used to indicate the same components, which will not be described in detail.

Other Embodiments

The foregoing embodiments may be modified as follows.

In each of the first to fourth embodiments and all the variations, the generator controller (17) controls the torque of the generator (16). Alternatively, the generator controller (17) may control the rotational speed of the generator (16). Specifically, the generator controller (17) may control the rotational speed of the generator (16) so that the flow rate of the water turbine (15) decreases if the opening degree indicated by the opening degree information is less than the first threshold value, and that the flow rate of the water turbine (15) increases if the opening degree indicated by the opening degree information is greater than the second threshold value. Alternatively, the generator controller (17) may control both of the torque and rotational speed of the generator (16).

In each of the first to fourth embodiments and all the variations, the sensor (8) may measure the pressure instead of the flow rate; the command section (9) may calculate the command value of the pressure of the fluid based on the value measured by the sensor (8) so that the value measured by the sensor (8) reaches an intended value; and the opening degree control unit (10) may calculate the target opening degree based on the command value of the pressure. In this case, at least one of the torque or rotational speed of the generator (16) is controlled such that the rate of fluid pressure change resulting from a change in the at least one of the torque or rotational speed of the generator (16) is lower than the rate of fluid pressure change resulting from the opening/closing of the motor-operated valve (7). This can substantially prevent unstable pressure control by the command section (9).

In each of the first and second embodiments and the first and second variations of the first embodiment, the opening degree information is an analog signal, but may be a digital signal indicating the state of a full open limit switch, a full close limit switch, an intermediate limit switch, or any other similar component.

In each of the first and second embodiments and the first and second variations of the first embodiment, information indicating the target opening degree may be input, as the opening degree information, from the opening degree control unit (10) to the generator controller (17).

In each of the first to fourth embodiments and all the variations, the interval at which the motor-operated valve opening-degree determination section (23) calculates the corrected torque is set in advance. Alternatively, the motor-operated valve opening-degree determination section (23) may calculate the interval.

To calculate the interval, the value dQ/dx is first calculated based on the opening degree (=x) indicated by the opening degree information and the relationship between the flow rate (=Q) and opening degree of the motor-operated valve (7) represented by, for example, the graph shown in FIG. 8. Then, the rate (=dQ/dt) of flow rate change resulting from the opening/closing of the motor-operated valve (7) is calculated based on this value dQ/dx and the preset rate of opening/closing of the motor-operated valve (7) (=dx/dt). The rate of opening/closing of the motor-operated valve (7) (=dx/dt) is calculated based on, for example, the opening/closing time defined by the specifications of the motor-operated valve (7). Then, the interval at which the corrected torque is calculated is calculated so that the rate of the flow rate change resulting from a change in the torque of the generator (16) is lower than the calculated rate dQ/dt.

If the differential pressure of the motor-operated valve (7) changes, the memory device (25) may store the relationship between the flow rate and opening degree of the motor-operated valve (7) in relation to a plurality of types of pressure drop ratios $P_R$ as shown in the graphs of FIGS. 9 and 10, for example. Pressure sensors may be installed upstream and downstream of the motor-operated valve (7); the pressure drop ratio $P_R$ may be calculated based on the difference between the values measured by both of the pressure sensors; and the value dQ/dx may be calculated based on the opening degree (=x) indicated by the opening degree information and the relationship between the flow rate and opening degree of the motor-operated valve (7) determined by the pressure drop ratio $P_R$.

In each of the first to fourth embodiments and all the variations, a bypass motor-operated valve different from the motor-operated valve (7) may be connected in parallel to the water turbine (15), and an opening/closing signal for the bypass motor-operated valve may be controlled based on the opening degree information. In this case, the opening/closing signal for the bypass motor-operated valve is controlled so that the rate of flow rate change resulting from the opening/closing of the bypass motor-operated valve is lower than the rate of flow rate change resulting from the opening/closing of the motor-operated valve (7). This can substantially prevent unstable flow rate control by the command section (9).

In the third embodiment, the generator controller (17) estimates the opening degree of the motor-operated valve (7) based on the current torque and rotational speed of the generator (16). Alternatively, the generator controller (17) may estimate the opening degree of the motor-operated valve (7) based on the head of the motor-operated valve (7) and the value measured by the sensor (8). This estimation can be performed with reference to information, stored in advance, indicating the relationship among the head, flow rate, and opening degree of the motor-operated valve (7). The head of the motor-operated valve (7) can be calculated based on the difference between the value measured by the upstream pressure sensor (30) and the value measured by the downstream pressure sensor (31).

In the fourth embodiment, the generator controller (17) estimates the opening degree of the motor-operated valve (7) based on the current torque and rotational speed of the generator (16) and the value measured by the sensor (8). Alternatively, the generator controller (17) may estimate the opening degree of the motor-operated valve (7) based on the head and flow rate of the motor-operated valve (7). The flow rate of the motor-operated valve (7) may be acquired by a motor-operated valve sensor that is for measuring the flow rate of the motor-operated valve (7) and which is separate from the sensor (8) or by subtracting the flow rate of the water turbine (15) from the value measured by the sensor (8). The flow rate of the water turbine (15) can be estimated based on the state (torque and rotational speed) of the generator (16).

In each of the first to fourth embodiments and all the variations, the output of the AC/DC converter (21) is output to the system interconnection inverter (18). Alternatively, the output may be output to a direct current bus or a secondary battery. The AC/DC converter (21) and the system interconnection inverter (18) may be replaced with a matrix converter or a cycloconverter.

The present disclosure is useful for a hydroelectric power generation system and a generator control method.

The invention claimed is:

1. A hydroelectric power generation system included in a channel control system including a command section configured to output a command value of a flow rate or pressure of a fluid, an opening degree control unit configured to calculate a target opening degree based on the command value output by the command section, and a motor-operated valve installed in a channel through which the fluid flows and configured to open and close in accordance with the target opening degree, the hydroelectric power generation system comprising:
   a water turbine disposed in the channel in series or parallel with the motor-operated valve;
   a generator configured to be driven by the water turbine; and
   a generator control unit configured to control at least one of a torque and a rotational speed of the generator with reference to opening degree information indicating a measured value of an opening degree of the motor-operated valve,
   a signal obtained by an opening degree sensor configured to measure the opening degree of the motor-operated valve being transmitted to the generator control unit as the opening degree information.

2. The hydroelectric power generation system of claim 1, wherein
   the channel is provided with a sensor configured to measure the flow rate or pressure of the fluid flowing through the channel, the sensor being disposed in series with the motor-operated valve and the water turbine, and
   the command section is configured to calculate the command value based on a value measured by the sensor so that the value measured by the sensor be an intended value.

3. The hydroelectric power generation system of claim 1, wherein
   the generator control unit does not receive the command value from the command section.

4. The hydroelectric power generation system of claim 1, wherein
   the channel is provided with a sensor configured to measure the flow rate or pressure of the fluid flowing through the channel, the sensor being disposed in series with the motor-operated valve and the water turbine,
   the command section is configured to calculate the command value based on a value measured by the sensor so that the value measured by the sensor will be an intended value, and
   the generator control unit is configured to control the at least one of the torque and the rotational speed of the generator so that the opening degree indicated by the opening degree information is
      greater than or equal to a first threshold value that is above 0% and
      less than or equal to a second threshold value that is below 100%.

5. The hydroelectric power generation system of claim 4, wherein
   the sensor is configured to measure the flow rate of the fluid flowing through the channel, and
   the generator control unit is configured to control the at least one of the torque and the rotational speed of the generator so that
      a flow rate of the water turbine decreases if the opening degree indicated by the opening degree information is less than the first threshold value, and
      the flow rate of the water turbine increases if the opening degree indicated by the opening degree information is greater than the second threshold value.

6. The hydroelectric power generation system of claim 4, wherein
   the sensor is configured to measure the flow rate of the fluid flowing through the channel, and
   the generator control unit is configured to control the at least one of the torque and the rotational speed of the generator so that
      an effective head of the water turbine increases if the opening degree indicated by the opening degree information is less than the first threshold value, and
      the effective head of the water turbine decreases if the opening degree indicated by the opening degree information is greater than the second threshold value.

7. The hydroelectric power generation system of claim 1, wherein
   the channel is provided with a flow rate sensor configured to measure the flow rate of the fluid flowing through the channel, the flow rate sensor being disposed in series with the motor-operated valve and the water turbine,
   the command section is configured to calculate the command value based on a value measured by the flow rate sensor so that the value measured by the flow rate sensor will be an intended value, and
   a rate of flow rate change resulting from a change in the at least one of the torque and the rotational speed of the generator is lower than a rate of flow rate change resulting from opening and closing of the motor-operated valve.

8. The hydroelectric power generation system of claim 1, wherein
   the channel is provided with a pressure sensor configured to measure the pressure of the fluid flowing through the channel, the pressure sensor being disposed in series with the motor-operated valve and the water turbine,
   the command section is configured to calculate the command value based on a value measured by the pressure sensor so that the value measured by the pressure sensor will be an intended value, and
   a rate of fluid pressure change resulting from a change in the at least one of the torque and the rotational speed of the generator is lower than a rate of fluid pressure change resulting from opening and closing of the motor-operated valve.

9. A generator control method for use in a channel control system including a command section configured to output a command value of a flow rate or pressure of a fluid, an opening degree control unit configured to calculate a target opening degree based on the command value output by the command section, a motor-operated valve installed in a channel through which the fluid flows, the motor-operated valve being configured to open and close in accordance with the target opening degree, a water turbine disposed in the channel in series or parallel with the motor-operated valve, and a generator configured to be driven by the water turbine, the generator control method comprising:
   using a generator control unit to control at least one of a torque and a rotational speed of the generator with reference to opening degree information indicating a measured value of an opening degree of the motor-operated valve,
   a signal obtained by an opening degree sensor configured to measure the opening degree of the motor-operated valve being transmitted to the generator control unit as the opening degree information.

* * * * *